(12) United States Patent
Sloot

(10) Patent No.: US 6,322,866 B1
(45) Date of Patent: Nov. 27, 2001

(54) APPLIQUES FOR GARMENTS AND METHODS OF MAKING APPLIQUES

(75) Inventor: Alexander Sloot, Sugarloaf, PA (US)

(73) Assignee: Printmark Industries, Inc., Hazleton, PA (US)

( * ) Notice: Subject to any disclaimer, the term of this patent is extended or adjusted under 35 U.S.C. 154(b) by 0 days.

(21) Appl. No.: 09/169,625

(22) Filed: Oct. 9, 1998

(51) Int. Cl.[7] .................................................. B32B 3/00
(52) U.S. Cl. ........................... 428/40.1; 2/246; 2/403; 40/596; 428/7; 428/15; 428/40.1; 428/41.7; 428/42.1; 428/71; 428/317.1; 428/906.6
(58) Field of Search ............................... 428/40.1, 41.7, 428/42.1, 317.1, 906.6, 7, 15, 71; 2/246, 403; 40/596

(56) References Cited

U.S. PATENT DOCUMENTS

| | | | |
|---|---|---|---|
| 3,629,034 | 12/1971 | Kuroda | 156/219 |
| 3,629,035 | 12/1971 | Kuroda | 156/219 |
| 3,655,485 | 4/1972 | Zompa | 156/256 |
| 3,666,604 | 5/1972 | Coffet | 161/2 |
| 3,944,454 | 3/1976 | Burgheimer | 156/273 |
| 4,160,685 | 7/1979 | Kuroda | 156/219 |
| 4,267,219 | 5/1981 | Ueno et al. | 428/96 |
| 4,283,011 | * 8/1981 | Spector | 239/36 |
| 4,461,791 | 7/1984 | Matsui et al. | 428/15 |
| 4,578,309 | 3/1986 | Worth | 428/315.5 |
| 4,588,629 | 5/1986 | Taylor | 428/88 |
| 4,652,478 | 3/1987 | Maii | 428/43 |
| 4,815,149 | 3/1989 | Erhardt et al. | 2/243 B |
| 5,009,943 | 4/1991 | Stahl | 428/40 |
| 5,207,851 | 5/1993 | Abrams | 156/230 |
| 5,242,519 | 9/1993 | Wu | 156/154 |
| 5,346,746 | 9/1994 | Abrams | 428/195 |
| 5,411,783 | 5/1995 | Mahn, Jr. | 428/79 |
| 5,622,587 | 4/1997 | Barthelman | 156/251 |

* cited by examiner

Primary Examiner—Nasser Ahmad
(74) Attorney, Agent, or Firm—St. Onge Steward Johnston & Reens, LLC

(57) ABSTRACT

An applique for garments is provided having multiple layers, and a decoratively shaped perimeter and relief pattern having a relatively high profile and side wall being substantially perpendicular to the plain in which the raised and lowered portions lie. Methods for manufacturing are also provided.

15 Claims, 2 Drawing Sheets

APPLIQUES FOR GARMENTS AND METHODS OF MAKING APPLIQUES

FIELD OF THE INVENTION

This invention relates to appliques for garments, such as T-shirts, sweaters, hats and the like, and a method for making such applique. More specifically this invention relates to a multi-layer vinyl applique having flocked raised and lowered portions, and a decoratively shaped perimeter and relief pattern with a contrasting substantially vertical sidewall.

BACKGROUND OF THE INVENTION

Vinyl laminated transfers or appliques for garments, such as hats, T-shirts, and other clothing having a decorative shape provided by pre-die cutting are known. U.S. Pat. No. 5,009,943 to Stahl provides an applique made of laminated fabric having stitching, an upper woven blank, and a lower woven blank that has a shape that is larger and complementary to the shape of the upper woven blank and of a contrasting color so that a contrasting color is visible on the lower blank attached to the garment. Similarly, U.S. Pat. No. 5,411,783 to Mahn provides thermoplastic pre-die cut designs with molded relief patterns, sublimation printing, and adhered layers. U.S. Pat. No. 3,655,485 to Zompa provides pre-die cut vinyl layers adhered to one another.

Flocked appliques with decorative designs provided by pre-die cutting, or by applying the flocked fibers in a decorative design are known. U.S. Pat. No. 4,652,478 to Maii provides a patch made of pre-die cut, flat flocked pieces with adjacent pieces have contrasting colors and being connected with a separating web.

U.S. Pat. Nos. 5,207,851 and 5,346,746 to Abrams disclose transfers having flocked fibers applied in a decorative shape having an open interior section and adhered to a second layer that is visible through the open interior section. These appliques are expensive to produce, require careful positioning of the contrasting layers, and/or special flocked materials to achieve the desired decorative effect.

Appliques and laminates constructed of foam are known. U.S. Pat. Nos. 3,629,034, 3,629,035 and 4,160,685 to Kuroda disclose three-dimensional appliques having a continuous plastic cover layer, an intermediate synthetic foam layer, outer and inner bonding zones creating a relief pattern, a support or base layer, and a severed borderline. U.S. Pat. No. 5,622,587 to Barthelman provides a decal having a cover layer, a foam intermediate layer and a substrate having a relief pattern with arcuate edges.

Printing contrasting stripes and intricate designs on appliques is also known. This printing may be accomplished by printing the top layer before it is thermo-formed into the decoratively shaped pattern, known as pre-distortion printing. Predistortion printing typically results in poor print quality and the inability to provide intricate patterns. Alternatively, finished appliques may be printed.

U.S. Pat. No. 5,242,519 to Wu discloses a substantially flat foamed laminate having contrasting colors in alternating ridges and ridge-confined grooves. Wu does not disclose a flocked upper surface, a decoratively shaped relief pattern, providing color when the applique is formed, or contrasting stripes on the sidewalls of the relief pattern.

Appliques having relief patterns and contrasting colors corresponding to the bonding areas on a thermal die are known. U.S. Pat. No. 4,578,309 to Worth discloses a continuous micro-cellular cover layer laminated to a substrate with contrasting color on the upper surface of the cover layer corresponding to the compression surfaces of the top embossments of the heat sealing die used to compress the laminate. Worth does not disclose a foam or filler sandwiched between the micro-cellular layer and the substrate, a discontinuous upper layer, a flocked material, a relief pattern, a relief pattern with substantially vertical walls, much less a contrasting color on the substantially vertical walls.

U.S. Pat. No. 3,666,604 to Coffet discloses an ornamental article having a thickness of between 0.003 to 0.025 inches, opaque areas, continuous transparent top and bottom sheets, an intermediate foam or batting material, and transparent contrasting margins of design lines opposite the top embossments of the heat sealing die used to form the article. Coffet does not disclose a discontinuous upper layer, a flocked upper surface, opaque design lines, a substantially vertical sidewall, or a contrasting color on the sidewall of the relief pattern.

U.S. Pat. No. 4,588,629 to Taylor discloses an applique having a flocked surface on a continuous thermoplastic substrate, an intermediate foam layer, and a contrasting area of color opposite the top embossment of the heat sealing die, the flocked fibers contrasting with the continuous thermoplastic substrate. Taylor does not disclose a discontinuous substrate, a relief pattern with substantially vertical side walls, substantially vertical side walls contrasting with the flocked surface, or a substrate that does not contrast with the flocked fibers. Significantly, the area of contrasting color in Taylor would not result if a flocked material with the same color fibers and substrate were used.

A disadvantage of conventional appliques is that they tend to be either substantially flat without a high profile relief pattern, require multiple manufacturing steps or cannot be provided with a contrasting area of color on the side wall of the relief pattern or are not flocked. This presents the problem of not being able to provide a variety of intricate shapes and patterns or cannot be provided with the unique design feature of a relief pattern with flocked upper and lower surfaces and substantially vertical side walls of a color contrasting with the upper and lower flocked surfaces at relatively low costs. A further disadvantage of conventional appliques is that they tend to require special flocked or decorative materials as top layers to provide contrasting colors and decorative shapes and designs.

What is desired therefore is an applique having multiple vinyl layers that can be provided with a decoratively shaped perimeter, an intricate relief pattern having a substantially vertical side wall and a relatively high profile. What is further desired is a vinyl applique having a decoratively shaped perimeter, flocked raised and lowered portions and a relief pattern having a relatively high profile, and substantially vertical side walls that contrast with the flocked surfaces and that can be manufactured relatively inexpensively.

SUMMARY OF THE INVENTION

Accordingly, it is an object of the invention to provide an applique having a decoratively shaped perimeter and relief pattern having a relatively high profile and contrasting sidewalls that are not printed.

Another object of the invention is to provide an applique that can be provided with a decoratively shaped perimeter and a relief pattern with a relatively high profile that has substantially vertical side walls, flocked raised and lowered surfaces, and that can be provided in a variety of intricate designs, and that is relatively inexpensive to manufacture.

A further object of the invention is to provide an applique that can be provided with a discontinuous first layer and a substantially vertical sidewall comprised of a second layer.

What is still further required is an applique that does not require special flocked material as a first layer.

These and other objects are achieved by provision of an applique for garments and the like comprising a first vinyl layer, a second vinyl layer, a foam layer and a decoratively shaped perimeter having a relatively high profile and a relief pattern, the relief pattern having at least one raised portion and a lowered portion substantially surrounding the raised portion, the raised and lowered portions comprised of the first vinyl layer, and a contrasting side wall extending substantially perpendicular to the raised and lowered portions and comprised of the second vinyl layer. The applique may optionally be provided with an adhesive backing or adhered directly to the garment when it is formed. The applique may further optionally be provided with a filler layer so as to provide the relief pattern with an even higher profile.

In another aspect, the invention relates to a method of making appliques of the above character comprising the step of heat sealing an assembly of the layers utilizing a die having embossments in the shape of the decoratively shaped relief pattern so as to produce an applique with at least one raised portion and a lowered portion substantially surrounding the raised portion, the raised and lowered portions comprised of a first layer and substantially vertical side walls extending between the raised and lowered portion comprised of a second layer and contrasting with the first layer.

The invention and its particular features will become more apparent from the following detailed description considered with reference to the accompanying drawings.

DETAILED DESCRIPTION OF THE INVENTION

Figure 1:
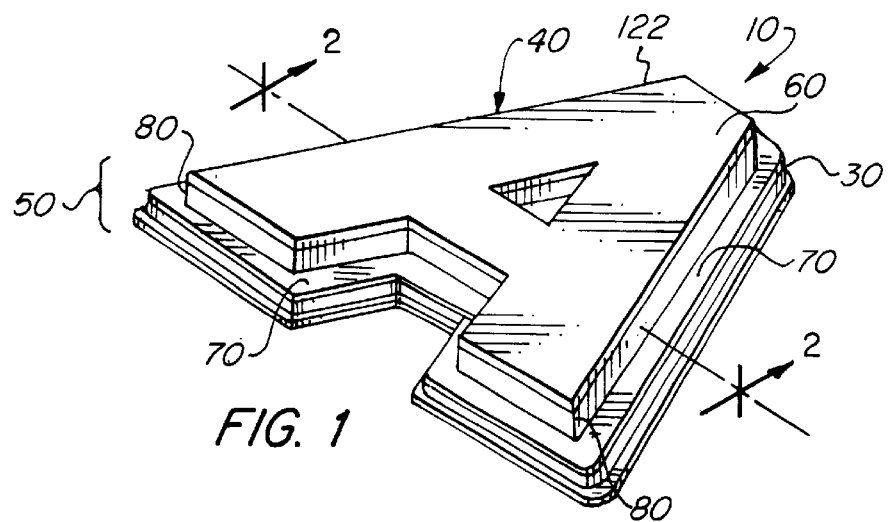
FIG. 1 is a perspective view of an applique in accordance with the invention.
Figure 3:
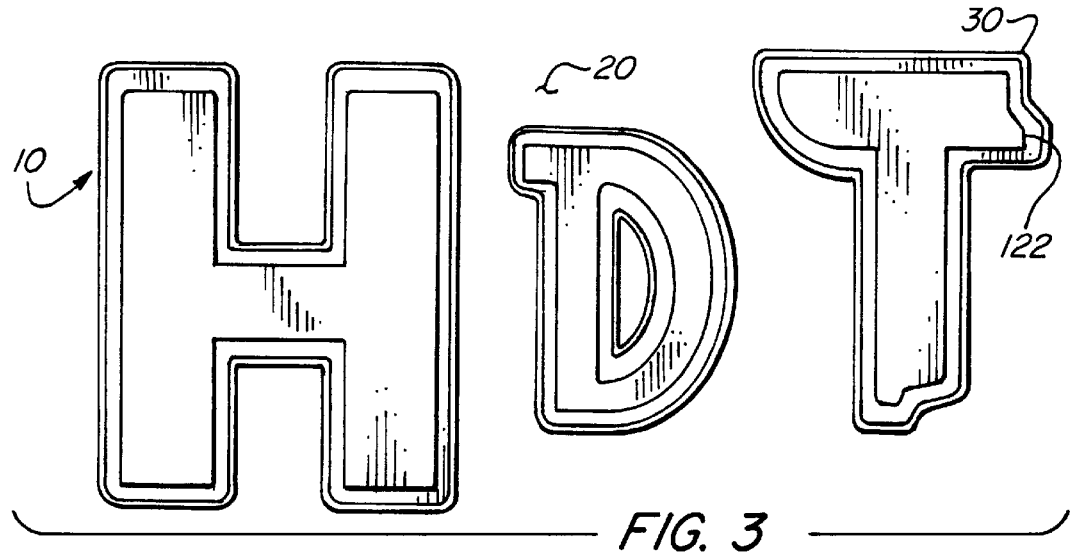
FIG. 3 is a front elevation view of the applique of the invention applied to a garment.

FIGS. 1 and 3 show appliques 10 for attaching to substrates 20, such as garments, heat-activated adhesives or pressure-sensitive adhesive backings with release liners, or cut-out fabric pieces in accordance with the invention. FIG. 1 shows a perspective view of the applique 10 having a decoratively shaped perimeter 30 and relief pattern 40 in the form of the letter "A". The relief pattern 40 of FIG. 1 has a relatively high profile 50, and at least one raised portion 60 substantially surrounded by a lowered portion 70. The sidewall 80 shown in FIG. 1 is substantially perpendicular to the plane in which the raised and lowered portions 60, 70 lie. It is understood that the applique can be provided with decorative perimeters 30 and relief patterns 40 other than those in the shape of the letter "A". It is understood that the decoratively shaped perimeter 30 is not limited to straight lines or uniform designs. More than one raised 60 and lowered 70 portions may result where different designs are used.

FIG. 3 shows a front elevation view of the applique 10 in accordance with the invention mounted on a substrate 20 such as a garment. It is understood that substrate 20, includes cut-out fabric pieces, and articles of clothing, including headwear and shoes, and pressure-sensitive adhesive backings, heat-activated adhesive and other adhesive backings. In the case where substrate 20 is a heat-activated adhesive or a cut-out fabric and/or a heat-activated or pressure-sensitive adhesive applied thereto, applique 10 may be later applied to a garment or other article of manufacture, rather than directly applied to a garment or other article of manufacture. It can be seen from FIG. 3 that, when looking at the front view of the applique 10 or the substrate 20, the sidewall 80 of the applique 10 is not substantially visible.

Figure 4:
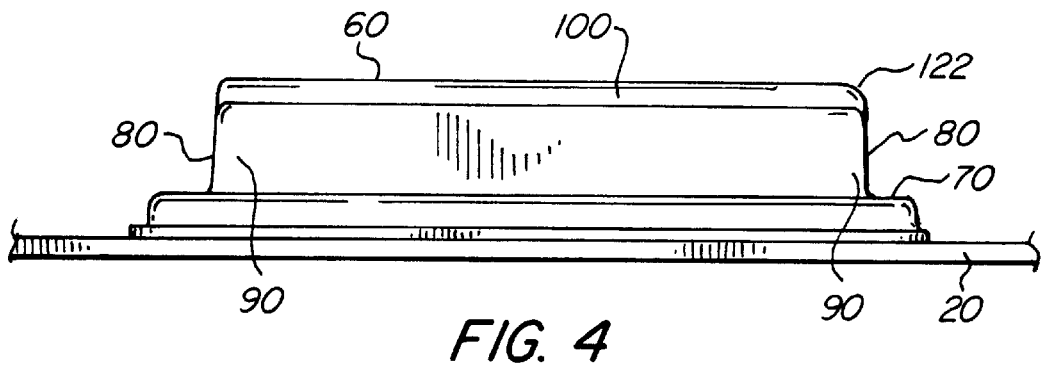
FIG. 4 is a side view of the applique of taken along section line 4—4 of FIG. 3.

FIG. 4 is a side view of the applique 10 of FIG. 3 taken along section line 4—4 of FIG. 3. It can be seen that the sidewall 80 is composed of the second vinyl layer 90 and the raised and lowered portions 60, 70 of the relief pattern 40 are composed of the first vinyl layer 100. In this sense, the first layer 100 of the applique 10 comprising the raised and lowered portions 60 and 70 is discontinuous, with the side-wall 80 comprised of the second vinyl layer 90 between the raised portion 60 and the lowered portion 70.

Figure 2:
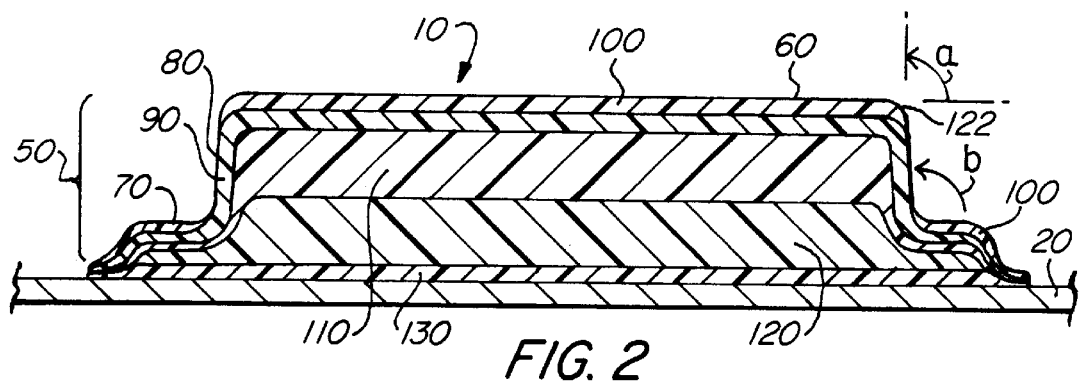
FIG. 2 is a cross-sectional view of the applique taken along the section line 2—2 in FIG. 1.

FIG. 2 shows an exploded cross-sectional view of the applique of FIG. 1 taken along section lines 2—2 of FIG. 1. It can be seen that the raised and lowered portions 60, 70 of the relief pattern 40 are made of a first vinyl layer 100, and the sidewall 80 is made of a second vinyl layer 90. Thus, a contrasting sidewall 80 can be provided by using a second vinyl layer 90 in a color or decorative finish that contrasts with the first vinyl layer 100. An applique 10 having the unique decorative features of a flocked raised and lowered portions 60 and 70, and unflocked side-walls 80 can accordingly be provided. It is understood that the lowered and raised portions 60, 70 are of the same material and are substantially flat. It is further understood that the flocked vinyl material can have flocked fibers that are the same color or a different color from the vinyl substrate comprising the flocked vinyl layer. A contrasting sidewall 80 is preferable, and is provided by using first and second vinyl layers 100, 90 contrasting with each other in color, transparency or other appearance, such as a foil and non-foil materials, and flocked and unflocked materials. Preferably, a contrasting sidewall 80 can be provided using standard flocked material as a first vinyl layer 100 and a contrasting second vinyl layer 90. A side-wall 80 that does not contrast with the raised and lowered portions 60 and 70 can be provided by using first and second vinyl layers 100 and 90 that are the same color, transparency or appearance. The first vinyl layer 100 is preferably provided with a heat-activated adhesive to reduce manufacturing time. It is further understood that the first layer 100 can be printed on the side opposite to any heat-activated adhesive.

It is preferred that appliques 10 having bulky or large decorative shapes or designs are used, rather than skinny or narrow decorative shapes and designs. A high profile 50 is provided by using a foam layer 110 adjacent to the second vinyl layer 90. An even higher profile 50 may be provided by using a filler layer 120 adjacent to the foam layer 110. "High profile" means a profile thickness ranging from about 0.010 inches to about 0.100 to about 0.200 inches.

FIG. 2 illustrates the substantially perpendicular sidewall 80 relative to the raised and lowered portions 60 and 70 of the applique 10. "Substantially perpendicular side wall" means that the angles, a and b, between the plane in which the sidewall 80 lies and the planes in which the raised and lowered portions 60 and 70 lie is between about 45 and 75 degrees. Thus the edges 122 formed between the raised and lowered portions 60 and 70 and the side walls 80 are not rounded but sharp.

It also apparent from FIG. 2 that the high profile 50 is made possible using a foam 110, and/or filler 120. The foam 110 is preferably a closed cell polyvinyl chloride foam. It is understood that any other closed cell foam that can be compressed and heat-sealed can be used, including polyurethane foam. Optionally a filler 120 may be provided which is open celled foam, such as, preferably, polyvinylchloride, or a polyurethane foam. In addition, a vinyl backing layer 130 may optionally be provided for increased adhesion to the substrate 20 and added rigidity. The backing layer 130, foam 110 and filler 120 may be any color, opaque or transparent.

Figure 5:
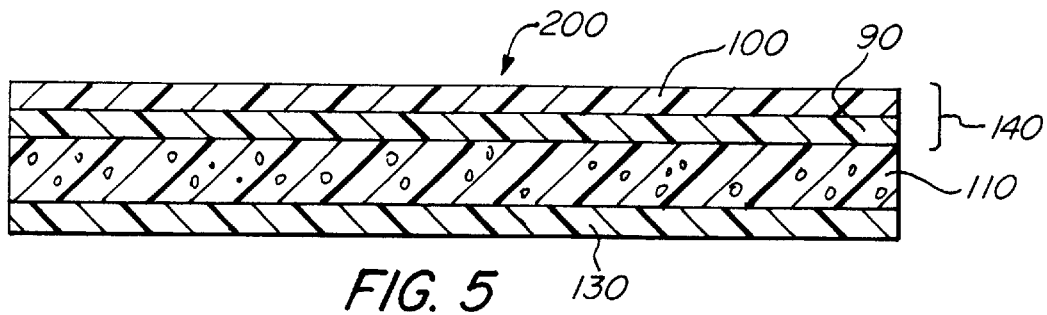
FIG. 5 is a side view of an assembly used for making the applique in accordance with the invention.
Figure 6:
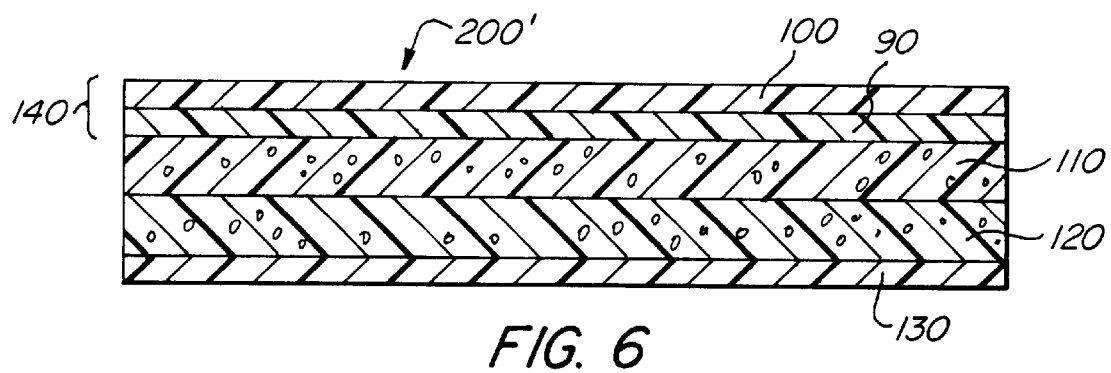
FIG. 6 is a side view of an assembly used for making another embodiment of the applique in accordance with the invention.

The applique 10 can be made by heat sealing an assembly 200, as shown in FIG. 5, comprising sheets of a laminate 140 of the first vinyl layer 100 and the second vinyl layer 90, a foam layer 110 and optionally a backing layer 130, using a radio-frequency sealing die in the shape of the decoratively shaped perimeter 30 and relief pattern 40, while applying pressure, directly to a substrate 20, such as a garment or an adhesive backing layer. The die is provided with standard cutting and sealing edges, but requires deep recesses so as to form the high profile 50 of the relief pattern 40. Optionally, the applique 10 can comprise a filler 120 as shown in FIGS. 2 and 6. Using a filler 120 is preferred and is achieved by heat sealing an assembly 200' as shown in FIG. 6.

The laminate 140 is formed by applying heat at a temperature of about 300° F. for a few seconds while applying pressure to the first and second layers 100 and 90. The laminate 140 is preferably made by using a first layer 100 having a heat-activated adhesive backing. Using a heat-activated backing reduces the time required to laminate the layers 90 and 100.

It is understood that no preheating, precutting, or special alignment of the laminate 140, and the layers 110, 120 or 130 is required to make an applique 10 in accordance with the invention, or an article of manufacture, such as a garment or pressure-sensitive adhesive and release liner having an applique 10 in accordance with the invention.

Although the invention has been described with reference to a particular arrangement of parts, features and the like, these are not intended to exhaust all possible arrangements or features, and indeed many other modifications and variations will be ascertainable to those skilled in the art. For example, the embodiments in accordance with the invention may be apparent to one skilled in the art for use on substrates other than garments or other than vinyl.

What is claimed is:

1. An appliqué for a garment, comprising:
    a foam layer having a raised portion, a lowered portion peripherally surrounding and extending beyond the raised portion, the raised portion being generally parallel to the lowered portion, and a side wall portion in contact with the lowered portion and extending in a generally vertical direction to be in contact with the raised portion;
    a first vinyl layer in contact with and covering the foam layer, the raised portion, the lowered portion, and the sidewall portions;
    a second vinyl layer in contact with and covering the first vinyl layer in at least one localized area.

2. The applique according to claim 1 wherein the second layer is flocked.

3. The applique according to claim 1 wherein the foam layer has a base spaced from the raised portion of the foam layer, the applique further comprising a backing layer adjacent to the base of the foam layer.

4. The applique according to claim 2 wherein the sidewall contrasts with the raised and lowered portions.

5. The applique according to claim 4 further comprising a filler layer between the foam layer and the backing layer.

6. The applique according to claim 4 further comprising a pressure sensitive adhesive layer adjacent to said backing layer opposite said first layer.

7. The applique according to claim 4 further comprising a heat-activated adhesive layer adjacent to said backing layer opposite said first layer.

8. The appliqué according to claim 1 further comprising a relief pattern and contrasting side wall formed by heat-sealing the layers.

9. An article of manufacture comprising:
    the appliqué according to claim 1, wherein the lowered portions of the first, second and foam layers are attached to a substrate at the lowered portion.

10. The article of manufacture according to claim 9 wherein the substrate is a garment.

11. The appliqué defined in claim 1 wherein the side wall portion of the foam layer extends perpendicular to the raised and lowered portions thereof.

12. An article of manufacture comprising:
    the applique according to claim 5 attached to a substrate at the lowered portion.

13. The article of manufacture according to claim 12 wherein said substrate comprises a vinyl backing having a pressure sensitive adhesive and a release liner.

14. The article of manufacture according to claim 12 wherein said substrate comprises a vinyl backing layer having a heat-activated adhesive layer.

15. The applique according to claim 1, wherein the at least one localized area is selected from the group consisting of the raised portion, the lowered portion, and combinations thereof.

* * * * *